July 4, 1933.    H. A. MULVANY ET AL    1,916,633
PROCESS AND APPARATUS FOR CLEANING FRUIT
Filed Sept. 23, 1929
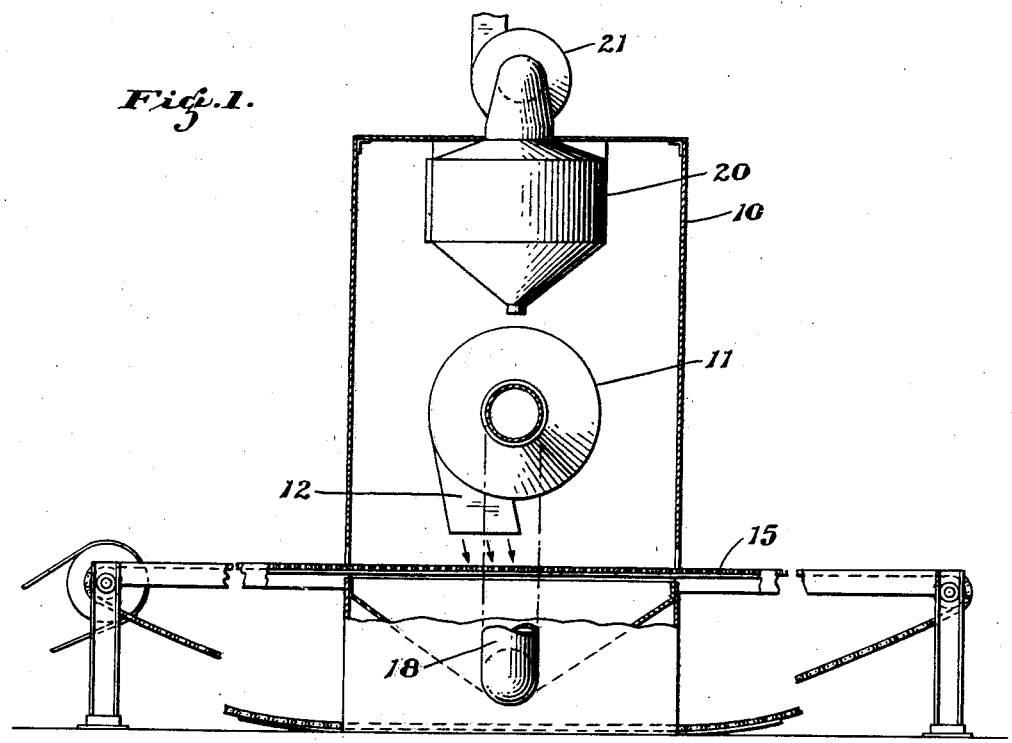
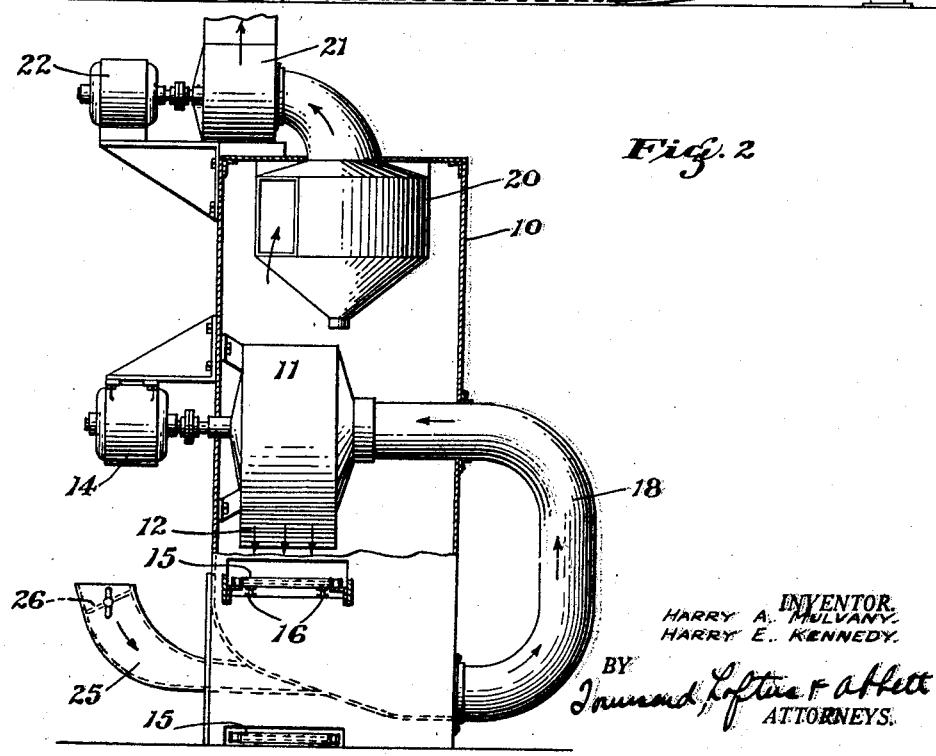

Patented July 4, 1933

1,916,633

UNITED STATES PATENT OFFICE

HARRY A. MULVANY AND HARRY E. KENNEDY, OF BERKELEY, CALIFORNIA

PROCESS AND APPARATUS FOR CLEANING FRUIT

Application filed September 23, 1929. Serial No. 394,554.

This invention relates to a process for removing foreign matter from the surface of fruit and vegetables.

At the present time the most effective insecticide sprayed on apples and pears grown on the slope of the Pacific Northwest and in California to control the devastation of the codling moth, is one made in the proportion of two and one-half pounds of lead arsenate to one hundred gallons of water. This insecticide solution is sprayed on the fruit at least two or three times and sometimes oftener according to weather conditions.

Due to the poisonous nature of this solution, the accepted maximum for the amount of arsenic as arsenic trioxide per pound of fruit is one one-hundredth of a grain. Where fruit is sprayed with this solution more than twice it becomes necessary to clean the fruit so as to reduce the lead arsenate content to the maximum just mentioned.

Hitherto, a considerable number of methods have been introduced for cleaning fruit. These processes may be classified as dry and wet processes. The dry processes hitherto employed have not been entirely satisfactory as is evident from the following quotation from circular number 59 United States Department of Agriculture on Removal of Spray Residue from Apples and Pears, "The average efficiency obtained for all varieties of apples with four typical dry cleaning methods under observation, ranged from 15 to 35 per cent. This fact indicates that dry cleaning, as a rule, will not be satisfactory for apples having an original residue content above 0.015 of a grain per pound, even where there are no complicated factors involved in the cleaning."

Most of these prior dry processes consisted of subjecting the fruit to the action of revolving bristle brushes or cloth discs.

The wet processes or washing methods may be divided into two groups on the basis of the solvents employed. One group employing hydrochloric acid and the other using alkaline materials. Probably the most effective of these prior wet methods, is the one using a two per cent solution of hydrochloric acid sprayed with pressure on the fruit. It has been found that the best results are obtained when the solution is heated between 90° and 100° F. After being sprayed the fruit is rinsed and dried. Drying the fruit after such treatment is of utmost importance to insure the proper storage life of the fruit. It is obvious that any method requiring such abrasive solutions must be carefully and intelligently practiced.

It has been found that if this wet process is attempted with poorly constructed equipment or by unskilled labor the fruit will be damaged principally by arsenical injury, generally confined to the calyx region. Also the fruit may be damaged by acid burns due to insufficient rinsing and any fruit with an open calyx tube will admit the housing solution to the core, causing core injury.

It is the principal object of the present invention to provide an improved process and apparatus for removing foreign matter and insecticide residue from the fruit by dry process which is highly efficient and not liable to injure the fruit.

In practicing the invention the fruit is subjected to a blast of such material as sawdust which is sufficiently abrasive to remove any insecticide residue from the fruit but not sufficiently abrasive to injure the skin or surface of the fruit. By so subjecting the fruit, the surface thereof may be polished at the same time it is cleansed.

An apparatus for practicing the invention is disclosed in the accompanying drawing, in which—

Figure 1 is a side elevation of an apparatus for cleaning and polishing fruit with parts broken away to more clearly disclose its construction, Figure 2 is a view in end elevation of the apparatus with parts broken away to show certain features thereof.

Referring more particularly to the accompanying drawing, the apparatus comprises an enclosed housing 10 disposed within which is a blower 11 having a downwardly extending discharge nozzle 12. The blower 11 is operated by an electric motor 14 arranged horizontally. Beneath the nozzle 12 of the blower 11 is a conveyor 15 the upper flight of which extends horizontally through the housing 10 just beneath the discharge nozzle 12. The conveyor is formed of a plurality of parallel transverse rubber covered rolls connected together by endless chains. The chains are led over sprockets so that the conveyor may be driven at the desired rate of speed. The rolls of the upper flight of the conveyor bear on parallel guide rails 16 so that as the conveyor operates the rolls are revolved causing the fruit on the conveyor to revolve and expose all surfaces to the cleansing blast from the discharge nozzle 12 of the blower 11.

The material used to produce the cleaning action is a soft light finely divided material such as sawdust or like material such as bran, rice hulls etc. This material is introduced into the housing 10 and when the blower 11 is placed in operation its suction line 18 will carry the sawdust from the interior of the housing 10 to the blower which will discharge the material under high velocity through the nozzle 12 and impinge it on the fruit below the nozzle. This blast is of sufficient velocity to cause the sawdust to be sufficiently abrasive to remove all foreign matter from the exterior surfaces of the fruit under treatment.

We have also provided means for carrying away the broken and contaminated sawdust and the removed residue accumulating in the housing 10. This means comprises what is known as a hurricane separator 20 which is arranged in the upper end of the housing 10 and in communication with an exhausting blower 21 arranged at the exterior of the housing and driven by an electric motor 22. The dust and residue arising in the housing when the machine is in operation is withdrawn from the housing through the hurricane separator 20 and discharged. The heavy and clean material however settles to the bottom of the housing and returns through the pipe or conduit 18 to the blower 11. We may find it desirable to utilize an auxiliary air inlet 25 which extends from the atmosphere into the housing at the bottom thereof. This inlet 25 is controlled by a regulating valve 26 which may be manipulated to regulate the amount of air withdrawn into the housing.

We prefer to use sawdust in this process as the same is a commercial product and is graded, sacked and readily obtainable at a low cost. However our process may be practiced efficiently with milling such as bran and rice hulls and the use of such material would be just as economical as sawdust if obtainable. However, we find that screened sawdust is preferable.

In operation of the apparatus the motors 14 and 22 are commenced placing the blowers 11 and 21 in operation. Also the conveyor is driven and the fruit to be cleaned and polished is deposited thereon as the conveyor passes through the housing the rolls thereof will revolve causing the fruit thereon to revolve and expose all surfaces to the action of the blast emanating from the discharged nozzle 12 of the blower 11. As the sawdust impinges on the surface of the fruit it will remove all foreign matter and impart a polish to the fruit, all without injury to the skin thereof.

As the sawdust leaves the discharge nozzle 12 of the blower and impinges on the fruit the removed residue and contaminated and broken sawdust being lighter than the remainder of the material used will rise and will be withdrawn into the hurricane separator 20 and discharged from the machine while the contaminated and broken sawdust will settle to the bottom of the machine for recirculation through the blower 11.

While we have disclosed the present method as principally adapted for cleansing and polishing apples and pears we wish it understood that the same method may be applied to improve the appearance of various fruits and vegetables.

While we have disclosed the preferred form of our invention we wish it understood that various changes in the steps of the process and in the construction of the apparatus may be made without departing from the spirit of the invention as defined in the appended claims.

Having thus described our invention, what we claim and desire to secure by Letters Patent is—

1. A process of cleaning fruit which comprises subjecting the surface of the fruit to a blast of finely divided soft and light material in a closed chamber, said blast of divided material being sufficiently abrasive to remove foreign matter from the surface of the fruit, and exhausting the removed foreign matter from the chamber during the cleaning of the fruit.

2. A process of cleaning and polishing fruit which consists of subjecting the surface of the fruit to a blast of sawdust under sufficient velocity to create an abrasive action on the fruit sufficient to remove foreign matter from the surface of the fruit without injury to the fruit.

3. A process of cleaning and polishing fruit which consists in subjecting the entire surface of the fruit to a blast of sawdust, said blast being under a velocity to produce an abrasive action on the fruit suffiicent to remove the foreign matter from the surface thereof without injury to the skin of the fruit, and simultaneously separating the removed residue from the sawdust.

4. An apparatus of the character described comprising a housing, means for conveying fruit through the housing and simultaneously revolving the same to expose all surfaces thereof, means for directing a blast of light divided material on the fruit as it passes through the housing, and means for separating the removed residue and contaminated matter from the light divided material as the cleaning process proceeds.

5. A process of cleaning and polishing fruit which consists in subjecting the entire exterior surface of the fruit to a blast of finely divided soft and light material under a sufficient velocity to render it sufficiently abrasive to remove the foreign matter from the fruit but insufficiently abrasive to remove or injure the skin of the fruit.

HARRY A. MULVANY.
HARRY E. KENNEDY.